United States Patent [19]

Schmidt

[11] 4,201,892

[45] May 6, 1980

[54] MULTI-RATE TDMA COMMUNICATION SYSTEM

[75] Inventor: William G. Schmidt, Gaithersburg, Md.

[73] Assignee: Satellite Business Systems, Mclean, Va.

[21] Appl. No.: 919,518

[22] Filed: Jun. 27, 1978

[51] Int. Cl.² .............................................. H04J 3/06
[52] U.S. Cl. ....................................... 370/104; 370/97
[58] Field of Search ......... 179/15 BV, 15 BS, 15 AS, 179/15 BW; 325/4

[56] References Cited

U.S. PATENT DOCUMENTS

| Re. 28,577 | 10/1975 | Schmidt | 325/4 |
|---|---|---|---|
| 4,054,753 | 10/1977 | Kaul | 325/4 |

Primary Examiner—David L. Stewart
Attorney, Agent, or Firm—Pollock, Vande Sande & Priddy

[57] ABSTRACT

A multi-rate TDMA communication system includes a baseline TDMA network and at least one auxiliary TDMA network oprating through the same satellite repeater. The baseline and auxiliary networks may each include a plurality of ground stations, the baseline network stations operating at a bit rate different from the bit rate of the auxiliary network. To maintain orderly communications, a station synchronized with the baseline frame reference burst (FRB) transmits a sub-frame reference burst (SFRB) which latter burst is at a bit rate common to the auxiliary network stations. The auxiliary network stations synchronize to the SFRB.

12 Claims, 15 Drawing Figures

MASTER STATION

MASTER STATION

MULTI-RATE TDMA COMMUNICATION SYSTEM

FIELD OF THE INVENTION

The present invention relates to a communication system and, more particularly, such communication systems operating in a TDMA mode employing a quasi-stationary repeater in earth orbit.

BACKGROUND OF THE INVENTION

The earliest uses of satellite communication systems employed frequency division multiple access (FDMA) techniques to allow multiple channels per carrier. These systems were optimized for medium to heavy communication links. However, as time passed, a need for light traffic links was recognized. The result was the development and implementation of demand-assigned single channel per carrier FDMA systems such as SPADE. The demand-assigned single channel per carrier links could employ the same repeater used for a multiple channel per carrier FDMA system inasmuch as the two techniques were and are compatible.

It has now been recognized that time division multiple access (hereinafter TDMA) enjoys certain advantages over frequency division multiple access and therefore at least several such communication systems are now beginning operation or are in the planning steps. As a result of this activity, applications calling for light or sporadic per station communication needs are becoming apparent.

To serve these particular stations with the standard TDMA hardware would be an inefficient and therefore expensive mismatch of facilities to the services required. This is for the reason that light traffic stations would require the high bit rate r-f equipment and precise time measuring equipment used in other stations to ensure compatibility between stations and maximum efficiency.

Assuming the presence of a baseline TDMA network, including several stations and a repeater in a quasi-stationary earth orbit, it would be possible to serve the sporadic and light traffic needs of certain stations with the demand-assigned single channel per carrier prior art techniques, using a frequency division multiple access mode. However, this would be incompatible with the desire to employ TDMA techniques. For one thing, separate repeater or relays would have to be set aside for the FDMA service. In addition, "hub" stations, which work into both the baseline and light nets would require duplicate r-f facilities for the TDMA and FDMA channels. Accordingly, retaining FDMA techniques for the sporadic and light traffic needs of certain stations is not an attractive alternative.

In accordance with the invention, these competing desires are satisfied by using a single repeater and using different bit rates for baseline and light traffic networks.

While a majority of conventional TDMA systems employ a common bit rate throughout, the prior art does evidence proposals to employ multiple bit rates in a single TDMA system. For example, see "A Time Division Multiple Access System for the Defense Satellite Communications System" by Husted and Walker, appearing in the report of the 1970 EASCON, pages 229-237. The arrangement disclosed in the aforementioned publication mentions a TDMA system including stations operating at two bit rates, with the bit rates having a 4:1 ratio. However, this system has a number of unique aspects which make it of more limited application. For example, the system is proposed for an arrangement which includes a spread spectrum communication system from which system timing is available. Normally, system timing is not available from an external source. As such, there is no frame reference burst in the disclosed arrangement. Furthermore, bit timing and carrier recovery is carried out at a common bit rate for all the system stations regardless of the bit rate at which they transmit and receive traffic information. Thus, the publication does not suggest a TDMA system in which two frame reference bursts are provided, each at a different bit rate, in that as disclosed, no frame reference burst is provided. Furthermore, the disclosed system employs a common bit rate for carrier and bit timing recovery and thus, the low bit rate stations must be capable of demodulating the high bit rate signal.

Accordingly, it is an object of the present invention to provide a TDMA system, served by a single repeater, which includes at least two networks, a baseline network comprised of stations optimized for medium to heavy traffic, and therefore, operating at relatively high bit rates, and at least a second network including stations which are optimized for light traffic, and therefore, operate at relatively lower bit rates. It is another object of the present invention to provide a communication system in which a first group of stations is capable of sending and receiving control, signalling and traffic information at a first bit rate, and a second group of stations which are not capable of sending or receiving at the first bit rate, but which instead transmit and receive control, signalling and traffic information at a second lower bit rate, in which both groups of stations communicate among themselves in a TDMA format through a single repeater. It is another object of the present invention to provide for the modifications of conventional TDMA networks to allow a second network including stations incapable of sending and receiving at the bit rate of the first network, to be "piggy-backed" onto the same repeater.

SUMMARY OF THE INVENTION

These and other objects of the invention are met by providing a communication system which includes a first (or baseline) group of stations communicating among themselves in a TDMA mode through a single repeater in a quasi-stationary earth orbit, each station may transmit and receive control, signalling and traffic information at a first bit rate and which system further includes a second (or auxiliary) group of stations at least some of which are incapable of transmitting or receiving at the first bit rate, and instead, communicate among themselves in a TDMA format through the same repeater at a second bit rate, lower than the first bit rate.

In order to provide for orderly communication among the first group stations, one of those stations transmits a frame reference burst (at the first predetermined bit rate) for reception by all other first group stations for marking the beginning of a frame. Each of the first group stations is enabled to transmit information in burst form timed so as to avoid overlapping with bursts transmitted by any other station of the first group. Stations in the second group, each of which transmit and receive at the second bit rate, and are therefore incapable of receiving the frame reference burst, are enabled to transmit also in burst form so that transmissions from second group stations do not overlap, at the repeater, with transmissions from either first group or other second group stations. This is achieved by preventing first group stations from utilizing the entire frame period, and setting aside a certain portion of the frame period for the use of the second group stations. A first group station transmits a sub-frame reference burst at the second predetermined bit rate, synchronized to the frame reference burst, which sub-frame reference burst is received by all second group stations allowing them to time their respective bursts from the sub-frame reference burst.

In accordance with another aspect of the invention, an existing, or baseline, TDMA communication system, including a plurality of stations communicating among themselves through a repeater in a quasi-stationary earth orbit in a TDMA mode, is modified to enable the same repeater to handle communications between stations in a second group wherein the first group of stations transmit at a bit rate which is higher than at least some of the stations in the second group are capable of receiving. In accordance with this aspect of the invention, the baseline system includes a master station, transmitting a frame reference burst, and allocating burst times among the stations in the first group. The master station clears a portion of the frame for use by second group stations, and for enabling the second group stations to time their respective bursts, transmits a sub-frame reference burst at the second and lower bit rate for reception by the second group stations. As a result, each of the first and second group stations is capable of receiving and detecting a reference burst at the associated bit rate, and the sharing of the relay or repeater by stations in the first and second group merely means that neither group of stations can employ the entire time period of the frame between frame reference bursts or sub-frame reference bursts. The capacity of the second group stations to transmit through the repeater is determined by the portion of the frame period allocated to the second group stations. Thus, the master station can adjust this capacity by increasing or decreasing the portion of the frame allocated to the second group stations.

BRIEF DESCRIPTION OF THE DRAWINGS

The present invention will now be described in further detail so as to enable those skilled in the art to practice the same in accordance with the drawings attached hereto in which like reference characters identify identical apparatus and in which:

FIGS. 7A-7D are burst timing diagrams exemplary of typical operation; and

DETAILED DESCRIPTION OF THE INVENTION

Figure 1:
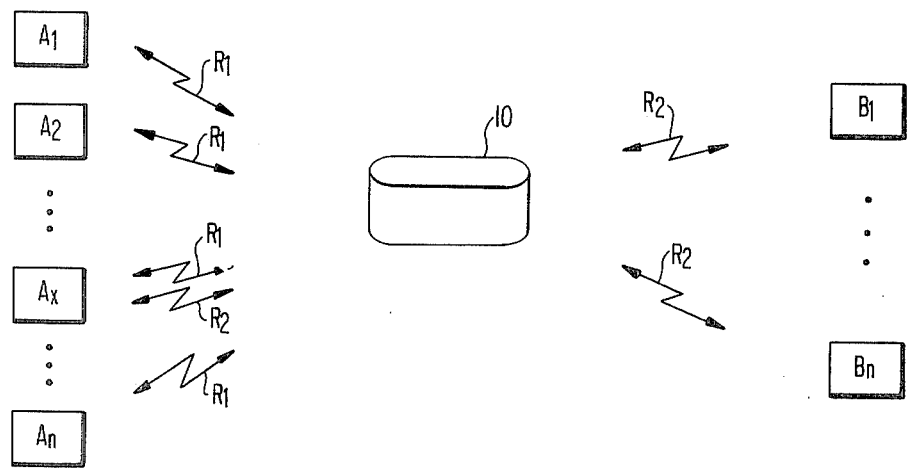
FIG. 1 is a schematic diagram illustrating an outline of the inventive communication system.

FIG. 1 illustrates a communication system which includes at least two communication networks. Both networks funnel all transmissions through a common repeater 10, preferably in a quasi-stationary or synchronous earth orbit. The repeater 10 may be a conventional hard-limiting TDMA repeater. Included in the communication system are a first (or baseline) group of stations $A_1$-$A_n$ which, as illustrated, transmit and receive at a first burst bit rate $R_1$. As will be disclosed below, one of the stations $A_1$ through $A_n$ is a frame reference station which transmits a frame reference burst, establishing a frame reference marker for a TDMA-based system. In addition, one of the stations $A_1$ through $A_n$, specifically, station $A_x$ (which may or may not be the frame reference station) also transmits a sub-frame reference burst at a second bit rate $R_2$, which is different than the bit rate $R_1$. The communication system also includes a second (or auxiliary) network, operating through the same transponder or repeater 10, also in a TDMA mode, comprising stations $B_1$ through $B_n$, each transmitting and receiving at the second burst bit rate $R_2$. Of course, as in any practical TDMA system, the burst transmissions from each of the stations must be arranged so that they do not overlap at the repeater 10. To illustrate the manner in which the bursts from the various stations are interleaved, reference is now made to FIG. 2A.

Figure 2A:
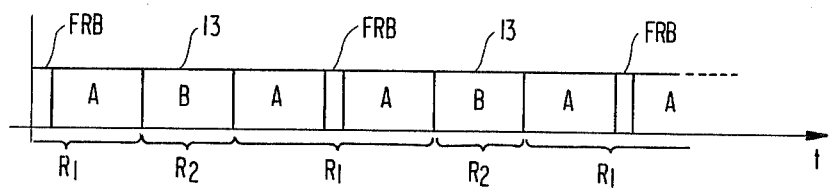
FIGS. 2A and 2B illustrate, respectively, how bursts transmitted by several of the stations appear at the repeater and the relationship between the various reference bursts and bursts from one of the two groups of stations.

FIG. 2A illustrates the manner in which bursts at the different bit rates $R_1$ and $R_2$ are interleaved at the repeater. More particularly, each frame is defined as beginning with the frame reference burst (hereinafter FRB) and ending at the next FRB. Following FRB is a burst or a number of bursts from one or more of the A stations at the bit rate $R_1$. A portion of the TDMA frame is allocated for transmissions by the B stations at the bit rate $R_2$, represented in FIG. 2A by 13. For purposes of generality, FIG. 2A shows that the frame also includes further transmissions from the A network stations after the B stations transmissions. This pattern of bursts is then repeated in the next frame, and so on.

Figure 2B:
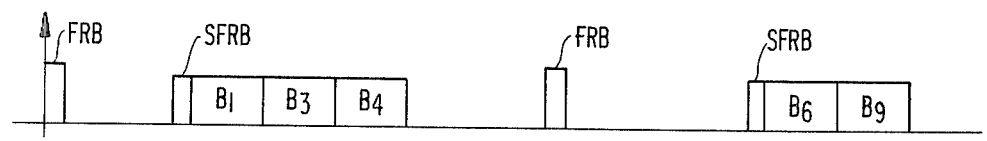

FIG. 2B illustrates essentially the same pattern, but only illustrates the bursts from the B network stations. The exemplary showing of FIG. 2B illustrates bursts from B stations $B_1$, $B_3$ and $B_4$. In addition to these bursts, and the FRB, FIG. 2B illustrates that each frame includes a sub-frame reference burst (hereinafter SFRB). The SFRB is, in distinction to the FRB, transmitted at the second bit rate $R_2$. Typically, the bit rate $R_1$ is much higher than the bit rate $R_2$ and accordingly, the B stations are incapable of demodulating the FRB or any of the transmissions from the A stations. On the other hand, since the SFRB is transmitted at the bit rate $R_2$, the B stations can and do respond to the SFRB, and time their bursts from this as a conventional frame reference marker.

In an exemplary system, the baseline or parent TDMA system may have a 15 msec. frame and a superframe structure including 20 frames; accordingly, the superframe is 300 msec. long. The advantages of employing a superframe structure are set forth in U.S. Pat.

No. 3,772,475. Inasmuch as the B or auxiliary network stations characteristically carry light and sporadic traffic, the auxiliary network requires a longer frame than that of the parent or baseline system to achieve the same transmission efficiency. That is, a portion of each frame is set aside for housekeeping functions which detract from the efficiency of the frame. In high traffic stations, a balance is struck between the equipment required (mainly memory) for long burst times as compared to the overhead required by short frames. Where the traffic content of a burst is lower, as in the B network, longer frame times are indicated to keep the bursts long with respect to the overhead. Thus, for efficiency purposes, the baseline superframe is employed as the auxiliary (or B) network frame, except that a portion of this "frame" is not available to the B stations, and this is the portion required for the A network transmissions.

In order to maintain the synchronized relationship between the frames of the two networks, preferably the station transmitting the FRB also transmits the SFRB, although a station synchronized with the FRB transmitter can also be used to transmit the SFRB. For purposes of this description, the baseline system access approach need not be specified inasmuch as it has no bearing on the invention. However, we will assume an auxiliary or B network which uses a demand assigned single channel per burst TDMA approach. This is reasonable since the advantage of the single channel per burst arrangement is that of servicing networks characterized by sporadic traffic. It should be understood, however, that other forms of multiple access could just as easily be used. In the single channel per burst format, a single voice channel is carried by a single burst, and accordingly, if a station has a number of active voice channels, a like number of bursts are transmitted. Each voice channel is allowed but one transmission per "frame" which actually is the baseline system superframe. Due to the assumed sporadic nature of the traffic at the B stations, however, typically, only one voice channel will be active at a station. To maintain an orderly system and to insure the systems' operability, however, each of the B network stations will transmit a signalling burst once every "frame" (of the auxiliary network which is equivalent to once every superframe of the baseline network).

The demand assignment of channels in the auxiliary network is assumed to be handled by some common entity, and to simplify equipment, the FRB and SFRB transmitter are selected for this function. An autonomous assignment system could also be employed. While this station, hereinafter the master station, establishes the FRB and SFRB, and establishes calls and disconnects the same for the auxiliary network, it does not act as a relay for the traffic.

Figure 3:
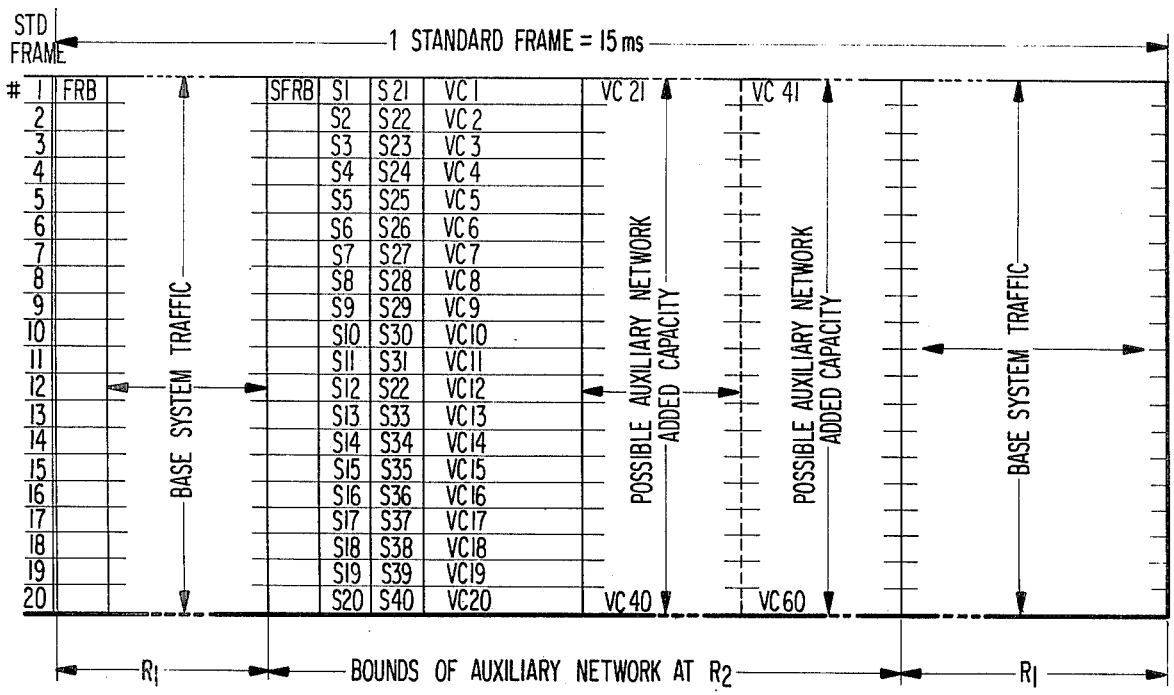
FIG. 3 illustrates the relationship between bursts from various stations and the relationship between the various reference bursts, standard frame and super-frame.

With the foregoing background in mind, FIG. 3 shows the format for a superframe, that is, 20 baseline network frames (in the Figure these are numbered vertically 1–20) which is a single auxiliary network frame. Notwithstanding the vertical showing, it should be understood that frame 2 follows frame 1, in time, and so on. In FIG. 3, bursts from the baseline stations are not explicitly defined, the time taken by these transmissions are merely labelled "Base System Traffic". The bursts identified as S1–S40 are signalling bursts, each from a different station in the auxiliary network whereas the bursts identified as VC1 through VC20 are different voice channels. The station originating the voice channel is not defined in FIG. 3.

Since we have specified that each station in the auxiliary network transmits a signalling burst every "frame", FIG. 3 implies that there are 40 such stations in the auxiliary network. At the same time, however, inasmuch as the traffic from these stations is assumed to be sporadic, voice channels 1–20, explicitly shown in FIG. 3, may well be sufficient to serve the needs of the auxiliary network. Accordingly, the portions of the baseline frame labelled "possible auxiliary network added capacity" can be used by the baseline network.

FIG. 3 shows that an SFRB is transmitted once per baseline frame and thus, there are multiple SFRB's per auxiliary network "frame". To provide the stations in the auxiliary network with an unambiguous reference, the frame count can be used to define the first SFRB per auxiliary network frame. Alternatively, the SFRB transmitted in the first frame of a superframe may be uniquely marked for detection in any conventional fashion, for example, by transmitting the first SFRB of each "frame" in complemented form.

Figure 4A:
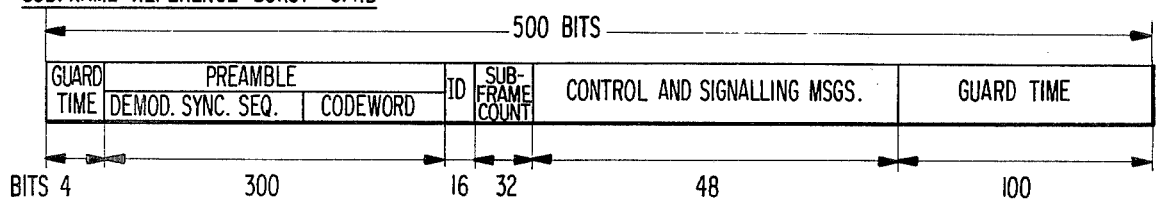
FIGS. 4A, 4B and 4C illustrate, respectively, the makeup of sub-frame reference burst, signalling burst and a traffic burst.
Figure 4B:
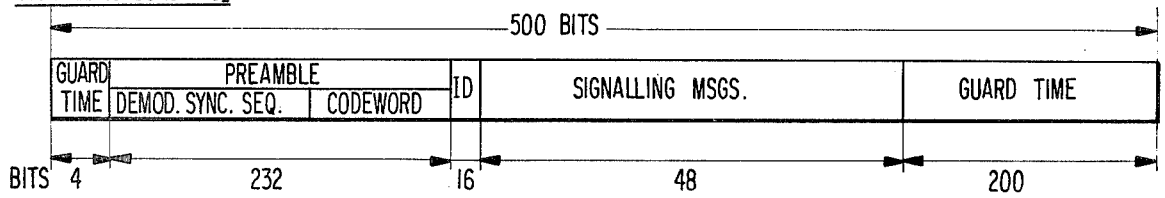
Figure 4C:
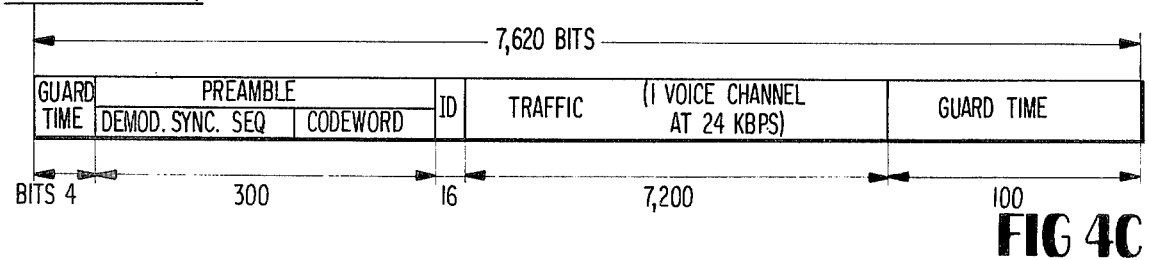

FIGS. 4A through 4C illustrate a preferred example of the SFRB, a signalling burst and a traffic burst for the auxiliary network. As shown in FIG. 4A, the SFRB comprises 500 bits. A 4 bit guard time is included at the front end, followed by 300 bits for demodulator synchronization and a preamble code word. The preamble is followed by 16 bits of identification, identifying the transmitting station. This is followed by 32 bits giving the sub-frame count to enable the auxiliary network stations to identify the SFRB at the beginning of its frame (corresponding to the beginning of the baseline superframe). Following the sub-frame count, the SFRB may include a control and signalling message of 48 bits. A guard time, 100 bits, concludes the SFRB.

The signalling burst, shown in FIG. 4B, also includes an initial 4 bit guard time, a preamble comprising a demodulator synchronizing sequence and a code word. A 16 bit identification code separates the preamble from the 48 bit signalling message. The signalling burst concludes with a 200 bit guard time.

An exemplary traffic burst is shown in FIG. 4C. It commences with an initial 4 bit guard time, and includes a 300 bit preamble comprising a demodulator synchronizing sequence and code word; a 16 bit ID word follows the preamble. The traffic burst itself includes space for a single voice channel at 20 kilobits per second, and therefore, 7200 bits. A 100 bit guard time concludes the voice channel burst.

Many of the burst durations shown are exemplary, although realistic; accordingly, they may be varied to suit various objectives. Typically, the guard time on bursts to be received by the master station may be less than the guard time on bursts to be received by B group stations since the master station does not require as large as "S/N-time" product as required by the B group stations. Furthermore, while the bit rate $R_2$ is at or near the maximum to which the B group stations can detect, the actual data traffic need not be at this rate, so long as it is at a rate to which the B stations can detect.

Those skilled in the art will notice that the guard time allocations for SFRB, the signalling burst and the traffic burst are much greater than that normally employed in high capacity TDMA systems. This provision is made to allow the use of open loop burst synchronization rather than the more complex closed loop technique. To use this open loop synchronization, the guard time allocation must be based upon satellite station keeping bounds, the satellite diurnal variation, the long term drift of the time bases in the stations of the auxiliary network and the knowledge that these stations have of their own location.

Returning now to FIG. 3, the 20 frames of a superframe correspond to a single "frame" of the auxiliary network. For the parameters of FIG. 3 and when operating, the auxiliary network has a minimum of 20 voice channels that are available to it. In other words, the master station, which allocates network capacity (see in this regard, U.S. Pat. Nos. 3,838,221 and 3,644,678) can distribute the baseline network's entire capacity to stations in the baseline network. This would effectively preclude the auxiliary network from operating. As a first increment of operation, the baseline network can also allocate sufficient space in its frame such that 20 voice channels are provided to the auxiliary network, along with 40 signalling bursts, as shown in FIG. 3. In addition, the baseline network can allow the auxiliary network further capacity, again in increments of 20 voice channels, each such capacity increment corresponding to a different "column" of FIG. 3. In reality, each "column" of FIG. 3 consists of burst of predetermined duration occurring in multiple frames of the baseline network at a common time following the FRB.

Figure 5:
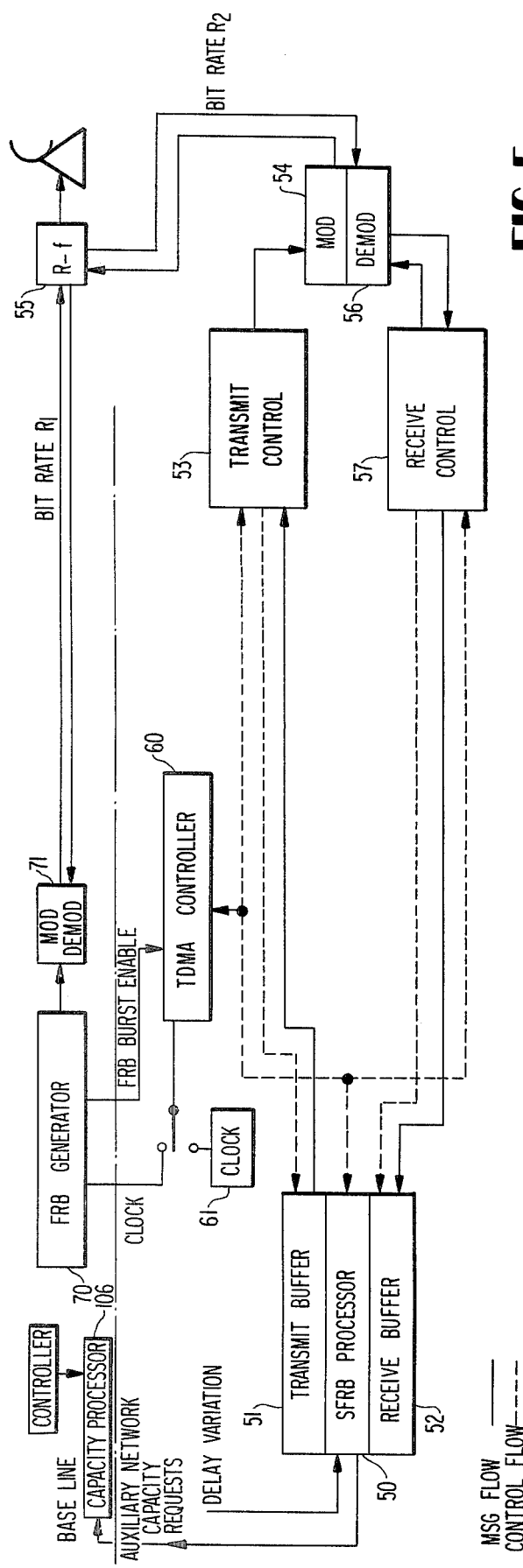
FIG. 5 is a block diagram of typical terminal equipment.
Figure 6:
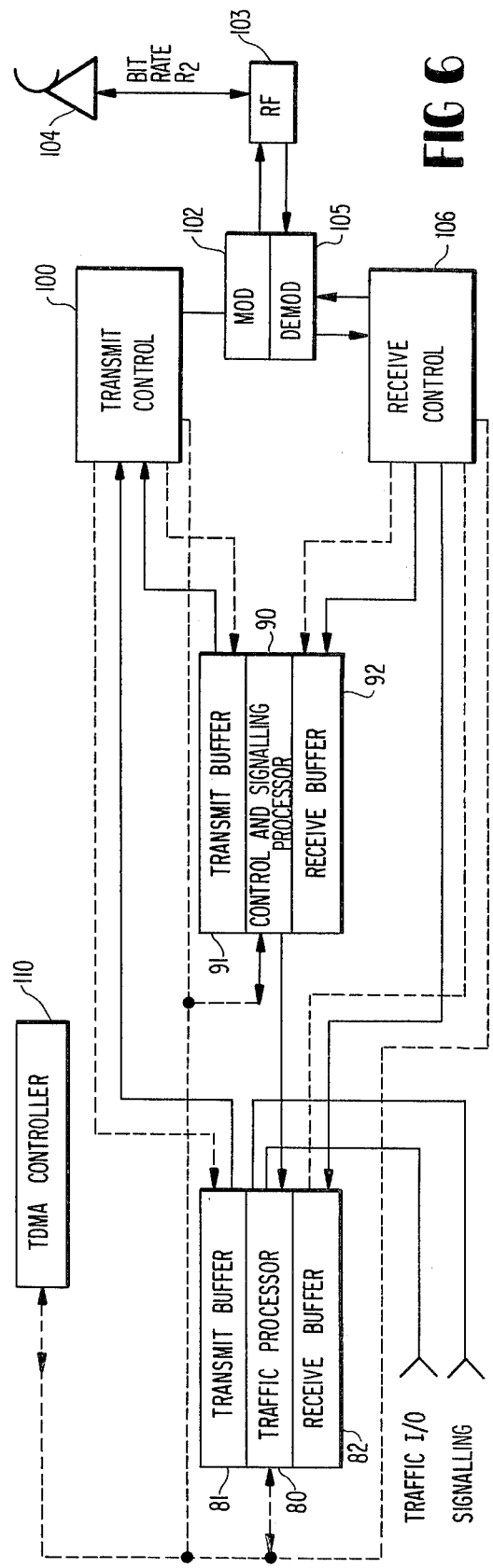
FIG. 6 is a block diagram of the auxiliary network controller/modem subsystem.

The apparatus to accomplish the foregoing functions are illustrated diagrammatically in FIGS. 5 and 6. FIG. 5 illustrates the master station configuration based on the assumption that the master station performs the function of transmitting the FRB, SFRB, as well as allocating capacity to both the baseline and auxiliary networks. This assumption is, however, not essential to the invention inasmuch as any station in the baseline network can be used to transmit the SFRB, as well as allocating channel capacity in the auxiliary network. If, as is desirable, the auxiliary network is to have variable capacity, then it is essential for the SFRB to have a communication link to the base network master station to exchange capacity assignment and requirements. As this description proceeds, the modifications necessary to separate the stations at which transmission of FRB and SFRB occur will be detailed.

FIG. 5, below the dot-dash line, illustrates the portion of the master station which is concerned with auxiliary network functions, hereinafter referred to as the sub-frame reference station (SFRS). The portions of the master station which are specific to the baseline network can take any form conventional in the art; reference has already been made to disclosures of this apparatus.

As shown in FIG. 5, the SFRS includes an SFRB processor 50 with associated transmit and receive buffers 51 and 52. The transmit buffer 51 is coupled to a transmit control 53 to actually couple a message in turn to a modulator 54. The modulator provides an input to the r-f equipment 55 which is, in turn, coupled to the antenna. Information received from the antenna is also coupled via the r-f equipment 55 to a demodulator 56 and thence to a receive control 57. The receive control 57, in turn, provides an input to the receive buffer 52. This receiver buffer is intended only to receive signalling messages. In overall control of these components is a TDMA controller 60.

To assist in the open loop synchronization process, the SFRB periodically includes normalized delay variation or ranging information on the satellite path.

The baseline equipment at the master station includes an FRB generator 70 coupled to r-f equipment 55 through modulation equipment 71. In line with the preceding discussion, the modulation equipment 71 operates at the first or higher bit rate $R_1$, whereas the modulator 54-demodulator 56 operates at the lower bit rate $R_2$. Those skilled in the art will understand that the FRB generator 70 is normally a part of the common control equipment for the baseline network and is illustrated in the manner of FIG. 5 only to aid in the understanding of the operation of the sub-frame reference station equipment.

The FRB generator 70 generates the frame reference burst in response to a burst enable signal from conventional apparatus. This burst enable signal is provided to the TDMA controller 60. A system clock might also be supplied to the TDMA controller 60. Alternatively, an auxiliary network clock 61 can be employed.

In typical operation, the baseline master station equipment clears some portion of its frame for use by the auxiliary system (see FIG. 3) for example, sufficient time to provide for 20 voice channels. Since the SFRB is to be synchronized with the FRB, a trigger pulse from the master station TDMA controller is used to initiate operation of the TDMA controller 60. This trigger pulse may be the FRB burst enable and is to be relatively fixed in time. The first such "burst enable" is used to reset the TDMA controller 60 and initialize the contents of all registers in the SFRB processor 50. The trigger pulse is then delayed a predetermined amount of time, i.e., the delay between the FRB and SFRB. After the delay, the transmit control 53 is enabled to read out the transmit buffer 51. The transmit buffer 51, at this time, includes control and signalling messages, having been placed there by the SFRB processor 50. The transmit control 53 provides the preamble portion of the SFRB (see FIG. 4A). In this fashion, the SFRB is produced and coupled through the modulator 54 to the r-f equipment 55 and thence to the antenna to the repeater. It should be noted that at this point the sub-frame count of the SFRB need not correspond to the baseline frame count.

This process is repeated every baseline frame, omitting the initialization procedures. It should be noted that the sub-frame reference station equipment does not include any apparatus to acquire or receive its own burst. This is for the reason that the baseline master station performs this synchronization inherently. The baseline master station or, preferably, the SFRB processor, may include a monitoring system to halt the transmission of the SFRB, if not correctly placed.

The signalling burst from the various auxiliary network stations are received at receive control 57 after demodulation in demodulator 56 and loaded into the receive buffer 52. The signalling message may, for example, relate to capacity requests to the baseline capacity processor 106. The information on new capacity allocation is coupled from the processor 106 to SFRB processor 50, transmit buffer 51 out to the various stations in the SFRB.

The foregoing apparatus thus provides for generation and transmission of the SFRB, and reception and processing of the signalling messages from each station. The connect/disconnect signalling procedures are similar to those employed in the FDMA/DA systems which are master-station oriented for call processing. The remaining transmissions come from the stations in the auxiliary network, and before discussion of the manner in which these transmissions are accomplished, reference is made to FIG. 6 which comprises a schematic of the equipment at a typical station.

As shown in FIG. 6, a typical auxiliary network station includes a traffic processor 80, associated transmit and receive buffers 81 and 82, a control and signalling processor 90 and associated transmit and receive buffers 91 and 92. The transmit buffers are capable of coupling information to a transmit control 100 which is coupled to a modulator 102. The modulator 102, in turn, couples to the r-f equipment 103, which is connected to the antenna 104. The r-f equipment 103 is also coupled to a demodulator 105 which is coupled to a receive control 107. The receive control 107, in turn, can load either the receive buffer 82 or receiver buffer 92.

In overall control of the apparatus is a TDMA controller 110. Traffic I/O and signalling information is coupled to the traffic processor 80 which itself is coupled to the control and signalling processor 90. The auxiliary network typical station may well comprise wholly conventional TDMA equipment inasmuch as it responds to a reference burst (SFRB) and, based on allocation to it communicated through the signalling message transmits its allocated positions.

The only variation is that the equipment must be capable of timing from a selected SFRB, since there are a plurality of SFRB's per auxiliary network frame. As mentioned above, the particular SFRB can be selected by frame count or other conventional procedures, e.g., transmission in complemented form.

The preceding is based on the assumption that FRB and SFRB are transmitted by a common station. That, as mentioned, is not essential to the invention. A station transmitting the SFRB may be different from the FRB transmitter so long as it is synchronized to the SFRB. Instead of using the FRB burst enable to the SFRB transmitter, the received FRB is employed, corrected with the same correction used by the baseline equipment to accurately place its own baseline burst.

Before describing typical operation, mention should also be made of the capacity allocation techniques which, although conventional to the art, are made flexible by the interleaving of the traffic to the two networks. Changes in capacity requests from the baseline station may be handled in an entirely conventional fashion. Capacity requests from the stations in the auxiliary network are included in the control and signalling message and therefore are responded to by the SFRB processor which provides auxiliary network capacity requests to the capacity processor 106 of the master station. The capacity processor 106 handles capacity allocations for both baseline and auxiliary networks and includes, as is conventional, a slot memory which identifies, for each time slot in the frame, information as to whether or not the slot is in use, and, if in use, which station is employing the slot. Thus, when additional capacity requests are received, from either the baseline or auxiliary network, reference to the table will identify whether or not the additional requested capacity is available. The presence of the auxiliary network does limit the capacity available to the baseline network, and special procedures are necessary in making available additional capacity in the auxiliary network. These techniques are most readily explained in connection with FIG. 7.

FIGS. 7A and 7C illustrate the FRB of several different baseline frames, in time sequential order. Referring first to FIG. 7A, it will be noted that a portion of each frame is occupied by the auxiliary network, and this represents the minimum use of satellite capacity by the auxiliary network. Thus, the occupied portions of the frame (shown by the crossed square) are not available to the baseline stations, and this is reflected in the capacity processor 106, by the reservation of the slots forming this portion of the frame. The remaining portions of the frame can be assigned by the capacity processor 106 to any of the stations in the baseline network in any conventional manner.

FIG. 7B illustrates the auxiliary frame, in relation to the baseline frame, wherein it will be noted that one auxiliary frame corresponds to a baseline superframe. The auxiliary network does not "see" either the frame reference burst or the bursts by any of the baseline stations since these transmissions are at a bit rate in excess of the capacity of these stations. The auxiliary stations do, however, see the SFRB, and bursts by all of the auxiliary network stations. Thus, the auxiliary frame begins with an SFRB and, as shown in FIG. 7B, includes a plurality of auxiliary network bursts, 20 bursts being illustrated. It will be seen that these bursts are interspersed and time separated, the intervening periods of time being occupied by the baseline stations and thus not available to the auxiliary network. This is reflected in the slot memory for the capacity processor wherein the available slots are those illustrated, other slots not being available.

FIGS. 7A and 7B illustrate the case in which the auxiliary network has available to it its minimum capacity, i.e., 1 "column" of FIG. 3. To illustrate the manner in which the repeater capacity can be transferred from baseline network to auxiliary network and vice versa, FIGS. 7C and 7D are similar to FIGS. 7A and 7B although these Figures show additional capacity in the auxiliary network, which is therefore removed from the baseline network. Thus, as shown in FIG. 7C, the capacity unavailable to the baseline network has now been increased, and as illustrated in FIG. 7D, this capacity is available to the auxiliary network. A comparison of FIGS. 7B and 7D shows that the "frame" of 7B has 20 time slots whereas the "frame" of FIG. 7D now has 40. Those skilled in the art will understand that, while the particular numbers of slots or bursts is not important, the ability to shift repeater capacity from one network to the other and back again is significant. From the preceding it should also be apparent that it is not necessary that the auxiliary network have any capacity, that is, the baseline network can occupy the entire frame to the exclusion of the auxiliary network.

When the auxiliary network is to commence operation, the baseline network reserves the required number of slots in its slot memory, thus making capacity available; for example, a single "column" corresponding to 20 slots or voice channels and SFRB and signalling channel capacity. Under these circumstances, the master station may begin transmitting the SFRB which, in its control and signalling message, may include data defining satellite path delay and time of day. With the SFRB available, the auxiliary network stations can now enter the frame. Each of those stations, employing its own data base on geographic location relative to the "normalized delay data" included within the SFRB and the sub-frame count, as compared with its own alloted sub-frame for its signalling burst enables the station to transmit its own signalling burst as soon as the SFRB is acquired and the station's transmission equipment is ready. This reflex signalling burst is not essential, and the station's signalling burst can be initiated by a control message included in the SFRB. With still another technique, the approximate delay or satellite range data may be included in the SFRB control and signalling message. This information plus available information corresponding to the station's location is sufficient to enable the station to achieve open loop frame synchronization, sub-frame synchronization follows from the SFRB sub-frame count.

The foregoing functions are initiated by the acquisition of the SFRB by the receive control 107. This control performs SFRB acquisition, locks to the burst, generates the SFRB code word aperture as well as apertures for such traffic bursts as are directed to the station. The control and signalling information contained in the SFRB are provided to the control and signalling processor 90, which processor provides the information to the TDMA controller 110. The TDMA controller 110 performs the calculations necessary prior to transmission by the station, and maintains burst synchronization in a conventional fashion. At the proper time, the TDMA controller 110 enables the transmit control 100 to read out the contents for the transmit buffer 91. The transmit control 100 adds the appropriate preamble and identification. This procedure is repeated at each of the stations in the auxiliary network until each of those stations is transmitting a signalling burst properly located in the "frame". In this condition, the transmission of traffic is now possible.

Establishment of the traffic link is begun by the traffic processor 80 in response to a call establishment bit sequence. This bit sequence includes destination address, bit rate, port number of the originating terminal, a forward acting error control option, if any, and such other data as may be necessary. Traffic processor 80 reviews the bit sequence for accuracy, sets up the port for the call and then passes the complete call establishment sequence to the control and signalling processor 90 which places the message in the transmit buffer 91 for inclusion in the next outbound signalling burst.

The SFRS receives and processes all messages in the signalling burst. Initially, this process is performed in the receive control 57 which includes a dedicated aperture for burst selection. Initially, the SFRS receives information on the assignment of signalling burst to stations via the link with the FRS. The SFRB processor 50 passes this to the receive control 57 to provide an aperture listing. By way of this dedicated aperture and burst selection, the signalling burst from any station containing the call establishment sequence is directed to the SFRB processor 50. Processor 50 maintains a log of all port allocations, voice channel or time slot assignments, and such data as is necessary to make on-demand assignments of satellite capacity. As a result of the SFRB processor calculations, go and return time slot assignments are broadcast in the next available SFRB control and signalling message. Desirably, such assignment is not broadcast until the destination station has been checked to indicate that the station is available for reception. When the assignments are made, the originating and destination station copy the message into their control and signalling processors, i.e., control and signalling processor 90, adjust the ports, set up new apertures in the receive control 106, assign buffer space in the transmit and receive buffers 91 and 92 and transmission commences under control of the TDMA controller 110.

Traffic link disconnection is accomplished in a similar fashion via the signalling link with the SFRB processor, which broadcasts the message to remove the apertures and release the time slot assignments for assignment to other links.

Because the bit rates of the two systems are not the same, there is not a one to one correspondence between a time slot released by the baseline station and a time slot available for use in the auxiliary network. Rather, based upon an assumed approximately 4 to 1 ratio between bit rates, the relationship between these two quantities can be obtained from review of FIGS. 8A and 8B.

Figures 8A, 8B:
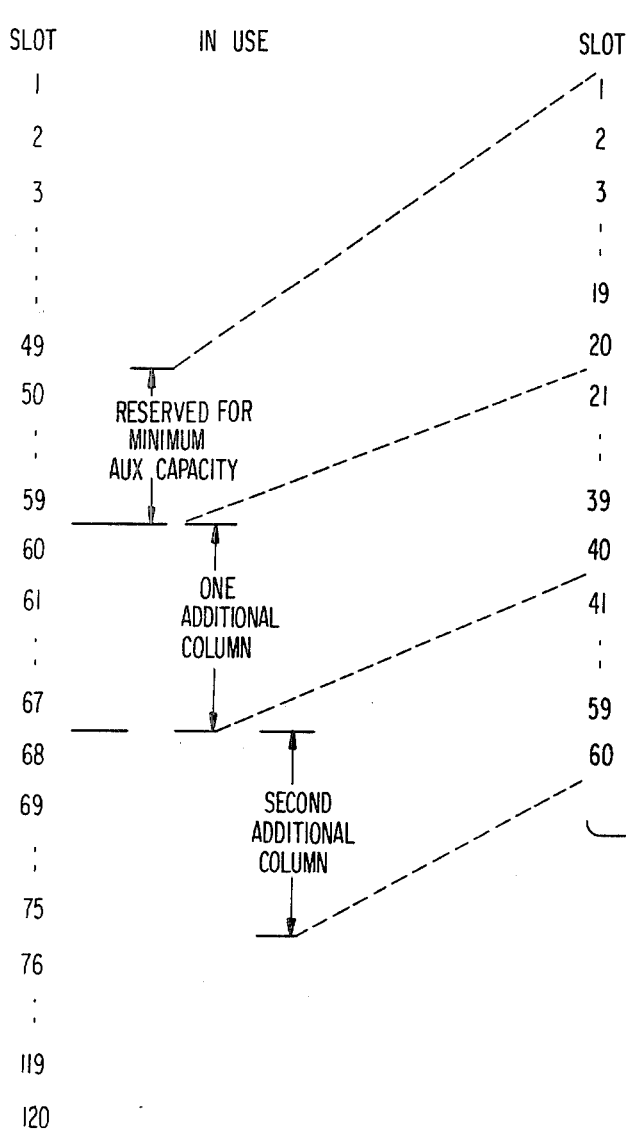
FIGS. 8A and 8B illustrate the relationship between baseline transmission slots and auxiliary transmission slots.

FIG. 8A is a schematic representation of the slot memory for the baseline system, assuming that the frame is broken down into 120 time slots, each of equal width. While this is not essential to the invention, and is only one example of how a frame can be broken down, it is sufficient to obtain an understanding of the relationship between time slots and the baseline and auxiliary networks. Assuming the baseline network employs a central authority which distributes time slot assignments, then the slot memory would reside there, and would have at least a single entry available for each of the 120 time slots to determine whether or not the slot was presently assigned. In addition, as illustrated in FIG. 8A, time slots 50 through 75 may be unavailable even though not in use by any of the first group stations. Before further referring to FIG. 8A, we will first refer to FIG. 8B.

FIG. 8B illustrates the slot memory for the auxiliary network, and shows a table having at least one entry for each of 60 slots. However, since the capacity of the auxiliary network is available, the network may have any where from no time slots to some maximum number in increments of 20, which is based on our assumption that each "column" (see FIG. 3) has a capacity of 20 time slots. The slot memory includes, in addition to an entry defining whether or not the slot is in use, an entry defining the beginning of the time slot for reasons which will appear hereinafter. This is decidedly different than the table of FIG. 8A since the beginning of each time slot of the baseline network is uniquely defined.

When the baseline network makes available the minimum capacity to the auxiliary network, the equivalent of ten time slots are employed and thus, as shown in FIG. 8A, time slots 50-59 become unavailable when the auxiliary network begins operating. The determination for each of the starting times of the time slots 1 through 20 for the auxiliary network can be determined by referring to a chart such as that of FIG. 7B, and measuring from the sub-frame reference burst.

Assuming now that the traffic in the auxiliary network is increased to the extent that additional capacity is required, the baseline network can make available an additional traffic "column". As shown in FIG. 8A, this has the effect of removing time slots 60-67 from availability, and provides the auxiliary network with an additional 20 time slots, 21 through 40. The starting times for each of the 40 time slots can now be determined by reference to FIG. 7D. Note that the starting times for the first 20 time slots of the auxiliary network is also changed, i.e., for example, time slot 3 in FIG. 7B and time slot 3 in FIG. 7D begin at different times referenced to the SFRB.

If the traffic of the auxiliary network increases still further, the baseline network can make available an additional 20 time slots which has the effect of preventing use of time slots 68-75 in the baseline network. Of course, to prevent confusion, before additional capacity is made available to the auxiliary network the equivalent time slots of the baseline station frame must be cleared. It should also be noted that the first 20 time slots of the auxiliary station require 10 time slots of the baseline network whereas each additional 20 time slots require only 8 time slots of the baseline network. The reason for this is that the minimum capacity required by the auxiliary network, in addition to the capacity required for the traffic time slots, is that required for transmission of the SFRBs as well as the signalling bursts.

Although the preceding has described a baseline network with a single auxiliary network, it will be appreciated that plural auxiliary networks could be simultaneously operative, along with a baseline network through a single transponder. Each auxiliary network requires exclusive access to a portion of the transponder frame. All auxiliary networks could use a single SFRB or each have their own SFRB. In the latter case, all SFRBs are synchronized with the FRB.

What is claimed is:

1. A communication system comprising plural, geographically separate stations communicating with each other in a TDMA mode through a quasi-stationary repeater in earth orbit, comprising:

means at one of said stations for periodically transmitting to said repeater a frame reference burst modulated at a first predetermined bit rate for defining a baseline frame, means at each of a first group of said stations for receiving said frame reference burst from said repeater, means at each of said first group of stations for transmitting to said repeater at said first predetermined bit rate in first mutually exclusive time periods referenced to said frame reference burst at said repeater, means for periodically transmitting a sub-frame reference burst at a second predetermined bit rate, different from said first predetermined bit rate to said repeater, means at each of a second group of said stations for receiving said sub-frame reference burst from said repeater, and means at each of said second group of stations for transmitting in second mutually exclusive time periods referenced to said sub-frame reference burst at said repeater, each of said second time periods exclusive of said first time periods.

2. The system of claim 1 wherein said means at each of said first group of stations for transmitting in first mutually exclusive time periods transmit for a total time less than the time period between adjacent frame reference bursts.

3. The system of claim 2 in which said means for periodically transmitting said sub-frame reference burst includes means for designating a particular one of n sub-frame reference bursts for defining an auxiliary frame for said second group stations which is n times the length of said baseline frame.

4. The system of claim 1 wherein said means for transmitting a frame reference burst and said means for transmitting said sub-frame reference burst are commonly located.

5. A multi-rate TDMA system employing a single repeater in a quasi-stationary earth orbit comprising:

a first network including a first group of stations with means for receiving and transmitting at bit rates up to a first bit rate, a second network including a second group of stations with means for receiving and transmitting at bit rates up to a second bit rate lower than said first bit rate, said means of said second group stations incapable of transmitting or receiving at bit rates in excess of said second bit rate, means for transmitting a frame reference burst at said first bit rate defining a frame with period T, means for transmitting a sub-frame reference burst at said second bit rate defining an auxiliary frame of period nT, where n is an integer greater than one, time slot assignment means for assigning a plurality of unique time slots of said frame to stations in said first group and for assigning unique time slots referenced to said sub-frame reference burst to stations in said second group.

6. The apparatus of claim 5 wherein said time slot assignment means assigns to second group stations time slots corresponding to x time slots of said frame, wherein x is a selectable integer less than all time slots of said frame.

7. A method of communication employing a quasi-stationary repeater in earth orbit to provide a communication link among a first group of geographically separated stations for the transmission of information at a first bit rate, and a communication link among a second group of geographically separated stations for the transmission of information at a second bit rate, said method comprising the steps of:

(a) periodically transmitting a frame reference burst from a one of said first group of stations at said first bit rate for reception by all other first group stations to thereby define a frame of period T, (b) periodically transmitting a sub-frame reference burst from a one of said first group of stations at said second bit rate for reception by all said second group stations to thereby define a frame of period T', (c) transmitting from any of said first group of stations at said first bit rate in predetermined time slots referenced to said frame reference burst at said repeater, and (d) transmitting from any of said second group of stations at said second bit rate in other predetermined time slots referenced to said sub-frame reference burst at said repeater, said other predetermined time slots exclusive of said predetermined time slots.

8. The method of claim 7 wherein the period T' equals an integer multiple of the period T wherein said integer is greater than one.

9. The method of claim 7 in which said step c is performed for time periods not occupied by transmissions of step d.

10. The method of claim 9 which includes the further step of allocating transmission times to second group stations wherein the sum of said transmission times is nKt, wherein t is the period of any transmission, K is a constant and n is an integer selectable in accoordance with traffic requirements.

11. A method of communication between a first group of geographically separated stations in a TDMA mode through a repeater in quasi-stationary orbit which repeater also serves a second group of geographically separated stations in a TDMA format based on a FRB at a bit rate in excess of that to which said first group of stations can respond comprising the steps of:

(a) clearing a portion of a frame defined by said FRB to be free of transmissions by second group stations, (b) transmitting an SFRB at a bit rate to which said first group of stations can respond and synchronized to said FRB, (c) allocating a burst time to at least one station in said first group occupying at least some of said cleared portion of said frame, and (d) transmitting from said at least one station in burst format in said allocated burst time based on receipt of said SFRB.

12. The method of claim 11 in which said step (b) comprises:

(i) transmitting said SFRB with period equal to said frame and specially designating one of each n SFRBs to thereby define an auxiliary frame n times the length of said frame, said step (c) comprises (ii) allocating plural burst times of said auxiliary frame within said cleared portion to plural stations within said first group and said step (d) comprises (iii) transmitting from said plural stations in associated allocated burst times within said auxiliary frame.

* * * * *